Jan. 26, 1937.  J. A. DORST  2,068,664
VEHICLE
Filed Jan. 11, 1936
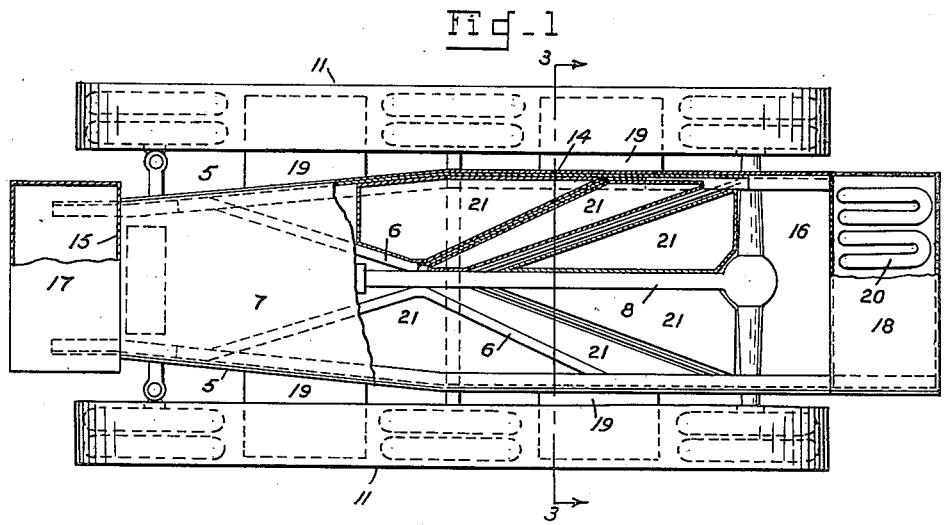
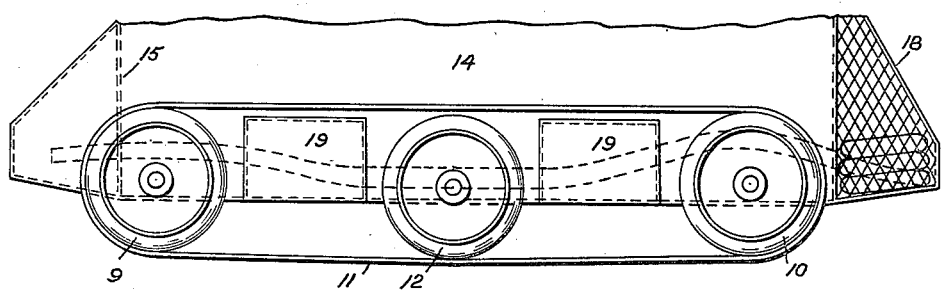
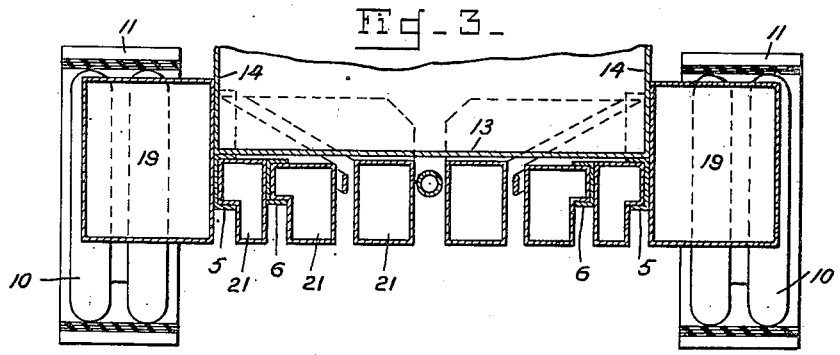
Inventor
James A. Dorst
By W. N. Roach
Attorney Patented Jan. 26, 1937

2,068,664

UNITED STATES PATENT OFFICE 2,068,664

VEHICLE

James A. Dorst, United States Army,
San Francisco, Calif.

Application January 11, 1936, Serial No. 58,707

1 Claim. (Cl. 115—1)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to a vehicle of the amphibian type which is particularly adapted for military purposes.

With a view to creating a potential reserve of military vehicles from a standard commercial automobile it is proposed in the present invention to equip a standard chassis with a buoyant body and buoyant auxiliary members to insure flotation and provide it with endless tracks to give traction on cross-country travel and propulsion when in the water.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view, with parts broken away, showing the application of the invention in converting a standard chassis into a track-laying amphibious vehicle.

Fig. 2 is a view in side elevation with the upper part broken away.

Fig. 3 is a sectional view on the line 3—3 of Fig. 1.

Referring to the drawing by characters of reference:

The vehicle comprises a commercial automobile chassis, that shown being a model 1935 Ford including a frame consisting of angled side rails 5—5, an X-shaped brace 6, a water cooled power unit 7, and power transmission 8. The front wheels 9 and rear wheels 10 are converted into twin-wheel units for the purpose of carrying endless tracks 11. An auxiliary wheeled axle unit 12 is positioned intermediately of the front and rear wheels and forms the subject of a separate application.

The body constitutes a water-tight unit and consists of a floor 13 secured to the side rails and extending under the power unit, side walls 14—14 secured to the side rails, a front wall 15 positioned forwardly of the power unit and a rear wall 16, both front and rear walls connected to the floor and side walls.

Flotation units 17 and 18 are carried respectively by the front and rear walls 15 and 16 and a pair of similar units 19—19 are carried by each of the side walls and disposed between the wheels. These flotation units may be watertight compartments or they may be wire containers enclosing flotation members such as inflated inner tubes 20 as suggested in the unit 18.

A plurality of flotation units 21—21 are positioned underneath the floor and are conveniently secured to the floor, side rails and X-brace as clearly shown in Fig. 3. These units are variously shaped to take advantage of all space without interfering with the standard parts of the chassis.

When the vehicle is being operated with the tracks in place, the front steering wheels are locked against turning in any convenient manner and steering is accomplished by a divided brake system as heretofore proposed in the art. The tracks also serve to propel the vehicle when in the water.

I claim:

A commercial wheeled vehicle including a conventional chassis frame with elevated portions for accommodating the vehicles' axles, a water-tight body having a floor secured to the frame, and a plurality of flotation units secured to the frame and floor, and fitting between elements of the frame, the upper sides of said units following the contour of the floor and frame.

JAMES A. DORST.